United States Patent [19]
Marhic et al.

[11] 4,194,808
[45] Mar. 25, 1980

[54] WAVE GUIDE FOR SURFACE WAVE TRANSMISSION OF LASER RADIATION

[75] Inventors: Michel E. Marhic, Evanston; Max Epstein, Highland Park; Larry I. Kwan, Skokie, all of Ill.

[73] Assignee: Northwestern University, Evanston, Ill.

[21] Appl. No.: 909,633

[22] Filed: May 26, 1978

[51] Int. Cl.² .................................................. G02B 5/14
[52] U.S. Cl. .................................................. 350/96.32
[58] Field of Search ............... 350/96.29, 96.30, 96.32, 350/96.12

[56] References Cited

U.S. PATENT DOCUMENTS

| | | | |
|---|---|---|---|
| 3,386,043 | 5/1968 | Marcatili et al. | 350/96.32 |
| 3,436,141 | 4/1969 | Comte | 350/96.32 |
| 4,068,920 | 1/1978 | Bass et al. | 350/96.12 |

OTHER PUBLICATIONS

Garmire et al., "Flexible Infrared-Transmissive Metal Waveguides," *Applied Physics Lett.*, vol. 29, No. 4, Aug. 1976, pp. 254–256.

Garmire et al., "Propagation of Infrared Light in Flexible Hollow Waveguides," *Applied Optics*, vol. 15, No. 1 Jan. 1976 pp. 145–150.

Marcatili et al., *Bell Syst. Tech. Journal*, No. 43, p. 1783, 1964.

H. Krammer, "Light Waves Guided by a Single Curved Metallic Surface," *Applied Optics*, vol. 17, No. 2, Jan. 1978.

*Primary Examiner*—Stewart J. Levy
*Attorney, Agent, or Firm*—Kegan, Kegan & Berkman

[57] ABSTRACT

Apparatus and method for transmission of laser radiation in the infrared portion of the spectrum. A 10.6 μm laser beam is focused tangentially upon an inner surface of an elongated synclastic wave guide having a generally oval cross-section, and an output end of the wave guide is directed upon a target. Preservation of spatial mode coherence in the laser beam is demonstrated both theoretically and experimentally.

14 Claims, 8 Drawing Figures

WAVE GUIDE FOR SURFACE WAVE TRANSMISSION OF LASER RADIATION

BACKGROUND OF THE INVENTION

The present invention relates to methods and apparatus for transmission of laser radiation without loss of spatial coherence. More particularly, the present invention relates to a wave guide for transmission of laser radiation which represents a significant improvement over the hollow rectangular wave guide disclosed in Bass et al. U.S. Pat. No. 4,068,920 issued Jan. 17, 1978.

Fiber optic wave guides are presently employed for conduction of laser radiation in the visible portion of the spectrum. Optical fibers are flexible and permit pointing and focusing of visible light. Instruments which include optical fibers are widely used in the fields of medical diagnosis and treatment. While fiber optic wave guides may be satisfactory for conduction of visible light, they are not suitable for transmission of infrared laser radiation because of large losses which occur at 10.6 $\mu$m.

Presently used surgical and industrial techniques for flexible delivery of infrared laser radiation to a target rely upon articulated arm systems of rotatable mirrors. Devices based upon articulated arm systems are bulky and delicate and cannot be manipulated as easily as fiber optic devices.

A hollow rectangular flexible infrared transmissive wave guide capable of transmitting more than 95% of incident 10.6 $\mu$m laser radiation for distances of 1 to 10 meters is described in Bass et al. U.S. Pat. No. 4,068,920 issued Jan. 17, 1978. The hollow synclastic shape of the wave guide of the present invention enhances preservation of spatial coherence of the laser beam in transmission compared with the hollow rectangular shape of the Bass et al. wave guide.

A hollow cylindrical wave guide for transmission of laser radiation is disclosed in Marcatilli et al., U.S. Pat. No. 3,386,043 issued May 28, 1968. Applicants' invention relies upon the discovery that a synclastic wave guide preserves spatial mode coherence of laser radiation directed tangentially along an inner surface of the guide. Because the Marcatilli et al. wave guide depended upon waves filling an entire cylinder rather than being guided along an inner surface, their guide was thought to attenuate laser waves so severely upon bending that wave guides bent with a radius of curvature of less than 48 meters would be impractical.

It is a principal object of the present invention to provide a synclastic wave guide having a generally oval cross-section, for transmission of spatially coherent infrared laser radiation without loss of spatial coherence.

It is a related object of the present invention to provide a method for using the synclastic wave guide of the invention.

Additional objects and advantages of the present invention will become apparent to persons skilled in the art from the following specification, taken in conjunction with the drawings.

DESCRIPTION OF PREFERRED EMBODIMENTS

Figure 1:
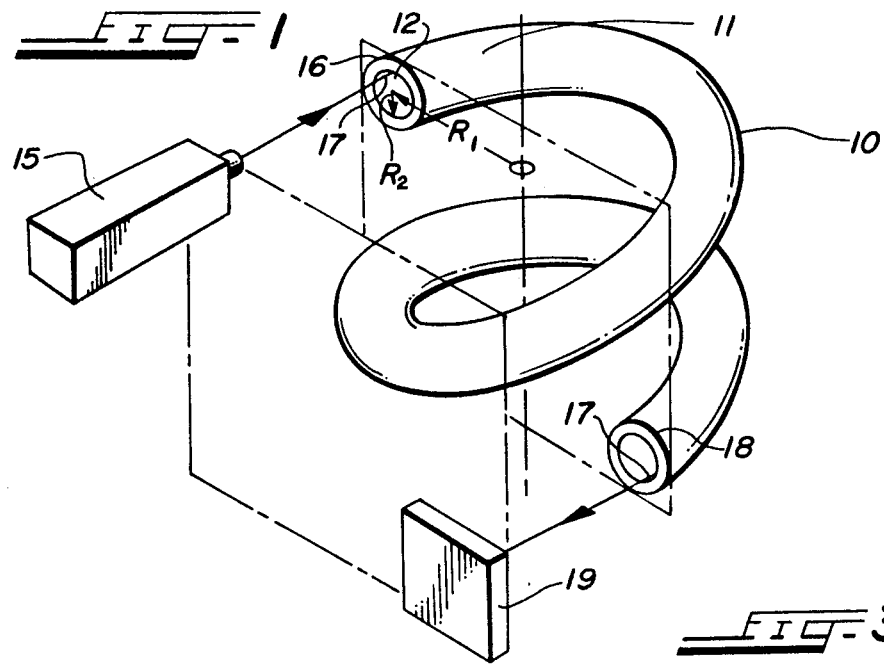
FIG. 1 is a schematic perspective view of a preferred embodiment of the apparatus and method of the invention wherein the wave guide of the invention is a coiled tube.

A preferred wave guide 10 of the invention comprising a coiled helical tube is illustrated in FIG. 1. In the preferred embodiment shown the wave guide 10 is a curved, flexible tube coiled in a single full (360°) turn or revolution. More revolutions or turns may be added if desired.

The wave guide 10 comprises a channel having a flexible outer or base layer 11 made of a thermoplastic material, and a thin inner layer 12 having an infrared wave-reflective inner surface. In the preferred embodiment shown and described herein the outer layer 11 is polytetrafluoroethylene and the inner layer 12 is copper. Other preferred materials for the inner layer 12 are metals such as aluminum, silver and gold.

The wave guide 10 has a radius of curvature $R_1$ measured from an axis of revolution exterior to the channel to an internal center axis. The channel 10 is oval and nearly circular in transverse cross-section with an internal radius $R_2$ being the distance from the internal center axis to an inner surface of the copper inner layer 12. In general, $R_1$ is greater than $R_2$ but $R_1$ is less than about 48 meters. A radius of curvature $R_1$ of less than about 1 meter is preferred. The radius of curvature $R_1$ is approximately 225 mm and the internal radius $R_2$ is approximately 5 mm in the particularly preferred embodiment of FIG. 1.

In preferred wave guides of the invention the channel 10 is concave and synclastic (i.e. curves inwardly in all directions). Expressed in Gaussian terms, a synclastic surface is a surface in which the curvature is always positive. Gaussian curvature K is the product of curvatures of curves at the intersection of two mutually perpendicular planes in the position where one curvature is maximum and the other is minimum.

A $CO_2$ laser 15 is focused to direct a 10.6 $\mu$m laser beam through an open input end 16 and tangentially along the inner surface of the wave guide 10. The beam is transmitted along a path 17 and emerges at an open output end 18. The channel 10 is flexed to direct the laser beam toward a target 19. Spatial coherence is preserved during transmission from the input end 16 to the output end 18. While performance of the preferred wave guides of the invention is described with reference to laser light having a wavelength of 10.6 $\mu$m, other wavelengths may be used. Wave guides produced in accordance with the invention are useful in the infrared and far infrared regions of about 1 μm to about 2000 μm.

Figure 2:
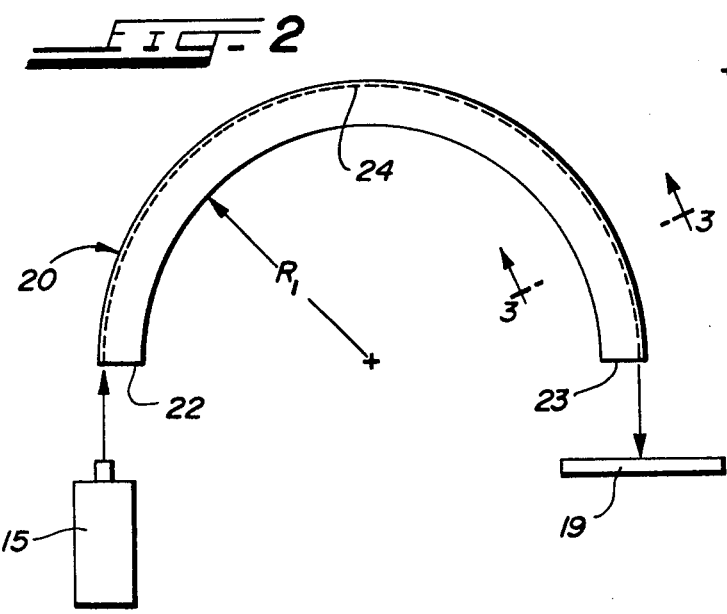
FIG. 2 is a schematic top plan view of a second embodiment of the apparatus and method of the invention, wherein the wave guide of the invention is a semicircular metal tube having an inner half cut away for demonstration purposes.
Figure 3:
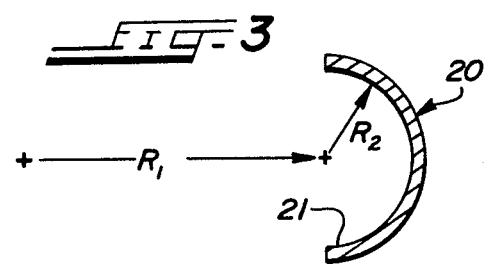
FIG. 3 is a cross-sectional view taken along the lines 3—3 of FIG. 2.
Figure 4:
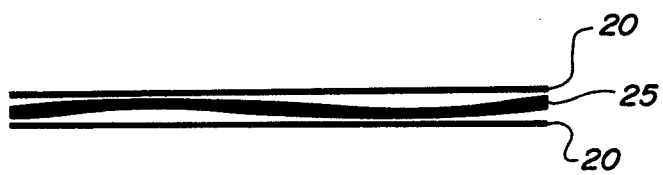
FIG. 4 is a front elevational view of the wave guide of FIG. 2, showing the trajectory of a He-Ne laser beam along an inner surface of the wave guide.

A second embodiment of a wave guide 20 of the invention is illustrated in FIGS. 2–4. The wave guide 20 is a curved section of open-ended copper tubing having a highly polished inner surface 21. For demonstration purposes an inner half of the tubing has been removed so that the wave guide 20 is nearly a half-cylinder in transverse cross-section, as shown in FIG. 3. The guide 20 has an open input end 22 and an open output end 23. The radius of curvature $R_1$ is 225±5 mm and the internal radius $R_2$ is 5.3±0.5 mm in the particularly preferred embodiment of FIG. 2–4. Other radii $R_1$ and $R_2$ may be used consistent with the conditions that $R_1$ is greater than $R_2$ and $R_1$ is less than about 48 meters. Values of $R_1$ less than about 1 meter are preferred.

In this second embodiment a $CO_2$ laser 15 is focused to direct a coherent 10.6 μm laser beam through the input end 22 and tangentially along the surface 21 of the wave guide 20. The beam is transmitted along a path 24 corresponding to an equator or equatorial portion of the guide 20. The beam emerges at the output end 23, and is focused upon a target 19.

A trajectory 25 of a coherent 0.633 μm laser beam along the inner surface of the wave guide 20 is illustrated in FIG. 4. This illustration is derived from an actual photograph, and it demonstrates that synclastic shape of the wave guide 20 preserves coherence during transmission. Broadened portions of the trajectory 25 correspond to temporary loss of phase, and narrower portions of the trajectory 25 represent regained synchronism.

The input laser beam in FIG. 4 has a diameter of about 10 μm. It has been calculated that the transmission phenomenon shown in FIG. 4 will occur when diameter of the input laser beam differs from 84 μm.

Periodicity of the trajectory 25 in FIG. 4 was measured to be 232±2 mm, compared with a calculated value of 216 mm. These values are considered to be in reasonable agreement considering unknown deformations in the wave guide 20 introduced by cutting.

The wave guide 20 of FIG. 2–4 is relatively insensitive to vertical deformations of several centimeters intermediate the input end 22 and output end 23. Coherence of the laser beam is still preserved in the wave guide 20. This insensitivity to deformation makes the guide particularly suitable for medical and industrial uses requiring flexibility in focusing the laser beam upon a target.

Although the two preferred wave guides described above with reference to FIGS. 1–4 are generally circular in transverse cross-section, wave guides produced in accordance with the invention may have other generally oval shapes. Hollow circular wave guides are preferred over other oval shapes because best results are obtained when a laser beam is focused in an equatorial region. Every point on the inner surface of a hollow cylinder is equivalent, which makes focusing at the input end less critical to performance than with other oval shapes.

Figure 5:
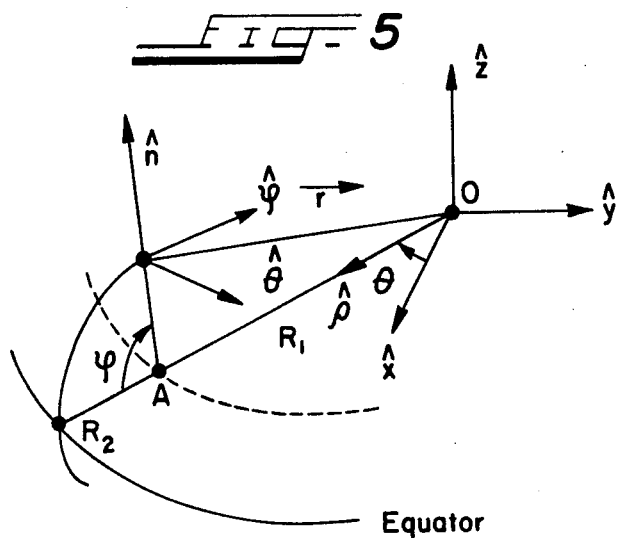
FIG. 5 is a schematic diagram showing the coordinate system used in deriving Equations (1) through (17) of the specification.

The wave guide and method of the present invention have been analyzed theoretically with reference to the coordinate system of FIG. 5. In this system the inner surface of the wave guide is a torus defined by:

$$\vec{r}(\theta,\phi) = R_1\hat{\rho} + R_2\hat{n}$$

Ray trajectories on the inner surface of this torus are subject to the constraint that their centers of curvature at any point must lie along a normal to the inner surface, a result of the law of reflection in the limit of grazing incidence. We therefore look for functions $\phi(\theta)$ such that $\vec{C} = d^2\vec{r}/ds^2$ is parallel to $\hat{n}$ for any $\theta$ (ds is the length element along the trajectory). Since $\hat{n}$ has no $\hat{\theta}$ component, we express that $\hat{\theta}\cdot\vec{C}=0$, which leads to the exact differential equation for $\phi(\theta)$ $$(R_1 + R_2\cos\phi)^2\sin\phi + 2R_2^2\sin\phi\left(\frac{d\phi}{d\theta}\right)^2 + R_2(R_1 + R_2\cos\phi)\frac{d^2\phi}{d\theta^2} = 0 \tag{2}$$

For rays propagating near the equator $\phi \ll 1$. Expanding Eq. (2) in terms of $\phi$, we obtain to the first order of approximation $$\frac{d^2\phi}{d\theta^2} + \left(1 + \frac{R_1}{R_2}\right)\phi = 0, \tag{3}$$

which for small aspect ratios ($R_2/R_1 \ll 1$) has solutions of the form $$\phi = \phi_o\cos\left[\sqrt{\frac{R_1}{R_2}}(\theta + \theta_o)\right] \tag{4}$$

Thus the rays oscillate about the equator much as rays in a fiber with a quadratic index profile. The length of a period of oscillation, measured along any ray, is $$S = \int_{\theta=0}^{\theta=2\pi\sqrt{\frac{R_2}{R_1}}} ds = 2\pi\sqrt{R_1R_2}$$

The analogy with propagation along graded index fibers can be strengthened by expressing the Helmoltz equation $$\nabla^2 E + k^2 E = 0$$

in coordinates $(\theta,\phi,n)$ where the torus becomes a plane surface. If n is measured from A in the direction of $\hat{n}$, $\nabla^2 E$ becomes $$\nabla^2 E = \frac{1}{(R_1 + n\cos\phi)^2}\frac{\delta^2 E}{\delta\theta^2} + \frac{1}{n(R_1 + n\cos\phi)}\left\{\frac{\delta}{\delta\phi}\left(\frac{R_1 + n\cos\phi}{n}\frac{\delta E}{\delta\phi}\right) + \frac{\delta}{\delta n}\left[n(R_1 + n\cos\phi)\frac{\delta E}{\delta n}\right]\right\} \tag{7}$$

Anticipating that the variations of E with $\phi$ and n will be much faster than those of n and $(R_1 + n\cos\phi)$, the Helmholtz equation becomes approximately $$\frac{\delta^2 E}{\delta\theta^2} + \frac{(R_1 + n\cos\phi)^2}{n^2}\frac{\delta^2 E}{\delta\phi^2} + (R_1 + n\cos\phi)^2\frac{\delta^2 E}{\delta n^2} + \tag{8}$$

-continued
$$k^2(R_1 + n\cos\phi)^2 E = 0$$

As usual, we look for solutions of the form $$E = e^{i\beta R_1 \theta} \psi(\theta,\phi,n), \qquad (9)$$

where $\beta \approx k$ and $\psi$ varies slowly with $\theta$. Substitution into Eq. (8) yields $$2i\beta R_1 \frac{\delta\psi}{\delta\theta} + \frac{(R_1 + n\cos\phi)^2}{n^2} \frac{\delta^2\psi}{\delta\phi^2} + \qquad (10)$$

$$(R_1 + n\cos\phi)^2 \frac{\delta^2\psi}{\delta n^2} + [k^2(R_1 + n\cos\phi)^2 - \beta^2 R_1^2]\psi = 0$$

where $\partial^2\psi/\partial\theta^2$ has been neglected compared to the first term. We now make the substitutions $u = R_1\theta$, $v = R_2\phi$, $w = n - R_2$, and keep only the lowest order terms in $v$, $w$, $R_2/R_1$ and $\partial\psi/\partial\theta$, which are all small quantities. This yields the approximate equation $$2i\beta \frac{\delta\psi}{\delta u} + \frac{\delta^2\psi}{\delta v^2} + \frac{\delta^2\psi}{\delta w^2} + \qquad (11)$$

$$\left[ k^2 - \beta^2 + 2k^2 \left( \frac{R_2}{R_1} + \frac{w}{R_1} - \frac{v^2}{2R_1 R_2} \right) \right]\psi = 0$$

which can be solved by separation of variables. Letting $$\psi = T(u,v)P(w), \qquad (12)$$

we obtain $$\frac{\delta^2 P}{\delta w^2} + \left[ \mu + \frac{2k^2 w}{R_1} \right] P = 0. \qquad (13)$$

and, $\frac{\delta^2 T}{\delta v^2} + 2i\beta \frac{\delta T}{\delta u} + \qquad (14)$ $$\left[ k^2 - \beta^2 + k^2 \left( 2\frac{R_2}{R_1} - \frac{v^2}{R_1 R_2} \right) - \mu \right] T = 0$$

where $\mu$ is the separation constant.

At this point it is worth noting that the approximations made amount to replacing Eq. (8) by $$\frac{\delta^2 E}{\delta u^2} + \frac{\delta^2 E}{\delta v^2} + \frac{\delta^2 E}{\delta w^2} + \qquad (15)$$

$$k^2 \left( 1 + 2\frac{R_2}{R_1} + \frac{2w}{R_1} - \frac{v^2}{R_1 R_2} \right) E = 0$$

This shows that in the toroidal system, where the torus is represented by the flat surface $w=0$, we have an effective index of refraction $$n_e = \left( 1 + 2\frac{R_2}{R_1} + \frac{2w}{R_1} - \frac{v^2}{R_1 R_2} \right)^{\frac{1}{2}} \approx \qquad (16)$$

$$1 + \frac{R_2}{R_1} + \frac{w}{R_1} - \frac{v^2}{2R_1 R_2}$$

The linear variation of $n_e$ with $w$ leads to Eq. (13), which is similar to the equation governing the field guided by a cylindrical surface of radius $R_1$,[1] with solutions given by Airy functions. The values of $\mu$ are determined by the condition that for a perfect conductor one must have $P(O)=0$.

For a given $\mu$ one can then solve Eq. (14). Because of the quadratic variation of $n_e$ with $v$, this equation has the same form as the equation for quasi-plane waves in a medium with a quadratic index profile, and as such admits Hermite-Gaussian solutions centered around sinusoidal ray trajectories,[2] each solution having a $\beta$ determined by the order of its Hermite polynomial. It can be shown that any solution of Eq. (14) repeats itself, within an unimportant phase factor, whenever u is increased by $S = 2\pi\sqrt{R_1 R_2}$. Also it is found that rays oscillate sinusoidally with the same spatial period, in complete agreement with Eq. (5). Another feature of Eq. (14) is that the width of the Hermite-Gaussian solutions will also oscillate with u, with period S/2 unless they have a spot size or diameter given by $$\omega_0 = \sqrt{\frac{\lambda}{\pi}} (R_1 R_2)^{\frac{1}{4}}. \qquad (17)$$

Introducing the values $R_1 = 225$ mm and $R_2 = 5.3$ mm into Eq. (5) gives $S = 216$ mm. As mentioned above, the actually observed spatial period of $232 \pm 2$ mm for a 0.633 $\mu$m beam having a spot size of about 10 $\mu$m is in reasonable agreement with this calculated value.

In general, a laser beam guided by a wave reflective surface follows a path such that at each point on the path a center of curvature lies on a normal to the surface, i.e. a geodesic of the surface. Guiding occurs so long as the center of curvature is on the same side of the surface as the beam, and ceases if an inflection point is encountered. A "developable" surface has everywhere a zero Gaussian curvature K and as a result such surface can be "rolled out" onto a plane without changing the length of any curve drawn upon it; such a deformation is called "isometric." Conversely, a portion of a flat sheet can in principle be isometrically deformed into a developable surface. Any developable surface has the remarkable property that if a geodesic line is marked on it, and the surface is subsequently deformed into another developable surface, the deformed line is a geodesic of the new developable surface. This means that a laser beam or ray guided by such surface appears to be "tied" to it. That is, if a ray propagates from A to B on the initial surface it still propagates from A to B after deformation.

Figure 6:
FIG. 6 is a front elevational view of the wave guide of FIG. 2, showing trajectory of a He-Ne laser beam along an inner surface thereof in three different positions of the guide.

This interesting behavior is displayed in FIG. 6, which corresponds to three photographs of a rectangular metal strip 60 guiding a 632.8 nm He-Ne laser beam from right to left along an axis of symmetry. In the horizontal position 61 the strip 60 is in a normal, undistorted position. In a second position 62 and third position 63 the strip 60 is isometrically distorted by displacing and twisting the left end while holding the right end fixed. The laser beam emerges at exactly the same location at the end of the strip 60 in all three cases.

This close connection between optical and mechanical properties of a developable surface means that guides including such surfaces will deliver laser energy at any preselected location and in any preselected direction (within certain practical limits) by bringing an output end of the guide to a desired location with a desired orientation. In addition, if no sudden changes of curvature are encountered along the trajectory, coherence of the wavefronts will be preserved if a single surface mode is excited. Developable surfaces, therefore, have practical value in situations where it is desired to have laser light emerge at a precise location with good spatial coherence.

However, there are two related problems associated with developable surfaces. These problems are a consequence of the fact that Gaussian curvature K=0, which implies that the equation for deviation of geodesics $$(d^2v/du^2)+Kv=0, \quad (18)$$

where u is the arc length along a reference geodesic $G_o$ and v is the distance between a neighboring geodesic and $G_o$, reduces to $$d^2v/du^2=0. \quad (19)$$

Equation (19) is the same as would be obtained on a flat surface, which means that if rays are launched from one edge of a surface where u=0 with slightly different angles, they will diverge. Thus a small error in pointing may result in a large displacement at the exit if the guide is long. Another consequence is that there is no mechanism to prevent the beam from spreading in the v-direction. Again, if the wave guide is long, this may lead to an unacceptably large spot size at the exit. There is thus a trade-off between predictability of output beam location after bending a developable surface, and loss of pointing accuracy and beam diffraction.

It is possible to combine the beneficial properties of developable surfaces (K=0) and synclastic surfaces (K>0). This can be done by attaching a flexible synclastic surface Ss interiorly of a more rigid developable surface Sd, the line of contact Lc being a geodesic of Sd. By construction this line is also a geodesic of Ss and remains so upon deformation of both Sd and Ss. Thus a light beam initially made to follow Lc will always do so. In addition, because the beam is guided by a surface with K>0, Equation 18 shows that slight misalignment at the input end will simply result in some oscillation around Lc so that exactness of alignment is less critical. Less diffraction is also expected, provided that a transverse cross-section of Ss is approximately circular in the neighborhood of the line of contact. Such an arrangement therefore has the following advantages:

1. Pointing of the input beam is less critical and length of the wave guide is not a limiting factor.
2. Once the input beam is aligned at an input end it will always emerge at the same position at the output end of the wave guide.
3. Curvature of the wave guide minimizes diffraction so that the beam width will be narrow at the output end of an elongated wave guide.
4. Spatial coherence is preserved if the input end is coupled to a single surface mode of the laser beam.

A wave guide having a small rectangular cross-section may possess the first three benefits mentioned above but will generally not preserve spatial coherence of the wave fronts. The superiority of a nearly circular wave guide over a rectangular one in this respect is analogous to superiority of a quadratic-index fibers over step-index ones for image transmission.

Figure 7:
FIG. 7 is a schematic top plan view of a third embodiment of the apparatus and method of the invention.
Figure 8:
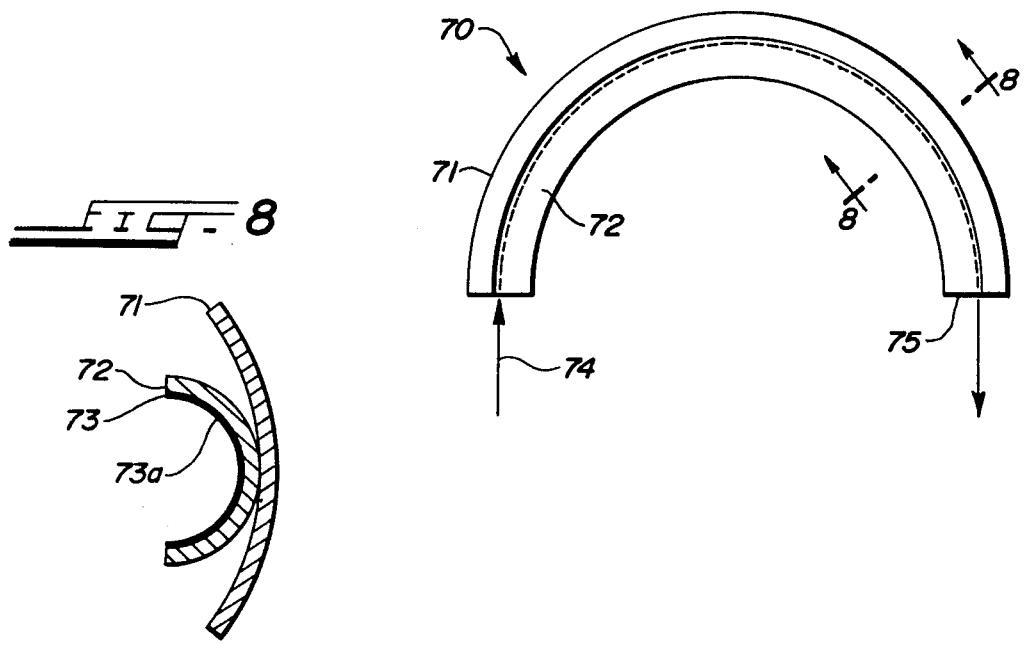
FIG. 8 is a cross-sectional view taken along the line 8—8 of FIG. 7.

A wave guide combining the advantages of synclastic and developable surfaces is shown in FIGS. 7-8. This hybrid wave guide 70 is constructed by securing a developable, isometrically deformable metal strip 71 exteriorly of a flexible synclastic plastic channel 72. The interior of this channel 72 is coated with a copper layer 73 having a wave-reflective inner surface 73a. This wave guide 70 gives substantially the same results as shown in FIG. 6, even after isometric deformation. A laser beam 74 is focused on the inner surface 73a to traverse a first path, emerging at an output end 75. A second path traversed by the laser beam across the inner surface after isometric deformation of the guide 70 is substantially the same as the first path.

Although the hybrid structure formed by combination of a developable outer layer and a synclastic inner layer theoretically provides superior results, such hybrid structure is very difficult to make. A synclastic-shaped copper guide like the one shown in FIG. 2 has been demonstrated to give results very similar to FIG. 6 when shape of the guide was varied. For most practical applications the simple synclastic wave guide of FIG. 2 is just as useful as the more complex, hybrid guide of FIGS. 7-8.

While the foregoing description of our invention has been made with reference to two preferred embodiments, persons skilled in the art will understand that numerous changes and modification can be made therein without departing with the spirit and scope of the invention as set forth in the following claims.

REFERENCES (1) H. Krammer, 17 App. Opt. 316 (1978)
(2) J. A. Arnaud, BEAM AND FIBER OPTICS (Academic Press, New York, 1976)

What is claimed is:

1. A wave guide for surface wave transmission of a beam of laser radiation having a wavelength of about 1 μm to about 2000 μm, comprising
    an elongated generally concave channel having a radius of curvature $R_1$ and a wave reflective inner surface,
    said channel having a generally semi oval transverse cross-section with an internal radius $R_2$, wherein $R_2$ is less than $R_1$ and $R_1$ is less than about 48 meters;
    whereby spatial mode coherence is preserved during transmission of laser radiation through said wave guide.
2. The wave guide of claim 1, wherein said wave reflective inner surface comprises a metal selected from the group consisting of copper, gold, aluminum and silver.
3. The wave guide of claim 1, wherein said channel comprises a flexible thermoplastic outer layer and a flexible metal inner layer interior of said outer layer.
4. The waveguide of claim 1, wherein said channel has an angle of revolution θ which is at least π radians.
5. The wave guide of claim 1, wherein said channel has an angle of revolution θ which is at least 2π radians.
6. The wave guide of claim 1, wherein $R_1$ is less than about 1 meter.
7. The wave guide of claim 6, wherein $R_1$ is about 225 millimeters and $R_2$ is about 5.3 millimeters.
8. The wave guide of claim 1, wherein said channel is flexible and has an outer surface opposite said wave reflective inner surface, and further comprising an isometrically deformable support having a developable inner face affixed to the outer surface of said channel.
9. The wave guide of claim 1, wherein said channel is synclastic.
10. A method for surface wave transmission of a laser beam having a frequency of about 1 μm to about 2000 μm, comprising the steps of
    (a) focusing a laser beam to impinge tangentially upon a wave reflective inner surface of a wave guide comprising a curved, concave channel having a radius of curvature $R_1$, a generally oval transverse cross-section with an internal radius $R_2$, an open input end, and an open output end;

(b) transmitting the laser beam along said wave reflective inner surface; and (c) directing the output end of said channel toward a target to illuminate said target with the laser beam;

whereby said laser beam remains spatially coherent during transmission by said wave guide.

11. The method of claim 10, wherein said channel is elongated and synclastic.

12. The method of claim 10, wherein said laser beam is focused to provide a beam diameter of less than about 84 μm at the input end of said channel.

13. The method of claim 10, wherein said channel comprises an equatorial portion, and said laser beam is focused and transmitted along said equatorial portion of the channel.

14. A method for surface wave transmission of laser radiation, comprising the steps of (a) focusing a laser beam to impinge upon a wave-reflective inner surface of a wave guide comprising an isometrically deformable developable strip, whereby said laser beam traverses a first path across said inner surface;

(b) isometrically deforming said wave guide; and (c) directing an output end of said wave guide toward a target to illuminate said target;

whereby a second path traversed by said laser beam across the inner surface of said wave guide after deformation thereof is substantially the same as said first path.

* * * * *